United States Patent
Blok

(10) Patent No.: US 6,660,795 B2
(45) Date of Patent: Dec. 9, 2003

(54) PTC CONDUCTIVE POLYMER COMPOSITIONS

(75) Inventor: Edward J. Blok, Wadsworth, OH (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 123 days.

(21) Appl. No.: 09/804,919

(22) Filed: Mar. 13, 2001

(65) Prior Publication Data

US 2002/0177644 A1 Nov. 28, 2002

(51) Int. Cl.[7] .................................................. C08K 3/04
(52) U.S. Cl. ...................... 524/495; 524/496; 524/191
(58) Field of Search ............................... 524/494, 495, 524/415, 496, 191; 338/22 R; 252/511

(56) References Cited

U.S. PATENT DOCUMENTS

| | | | |
|---|---|---|---|
| 4,237,441 A | | 12/1980 | van Konynenburg et al. |
| 4,388,607 A | | 6/1983 | Toy et al. |
| 4,534,889 A | | 8/1985 | van Konynenburg et al. |
| 5,174,924 A | * | 12/1992 | Yamada et al. ............. 252/511 |
| 5,229,452 A | | 7/1993 | Green et al. ................. 524/415 |
| 5,456,750 A | * | 10/1995 | Mackay et al. ............. 106/476 |
| 5,747,559 A | | 5/1998 | Whitehouse et al. ....... 523/205 |
| 6,156,837 A | * | 12/2000 | Branan et al. .............. 524/495 |

* cited by examiner

*Primary Examiner*—Robert Harlan
(74) *Attorney, Agent, or Firm*—Harness, Dickey & Pierce, P.L.C.

(57) ABSTRACT

The invention provides polymeric PTC compositions and electrical PTC devices with higher voltage capability and improved electrical stability. The PTC compositions include at a minimum an organic polymer and a conductive filler including carbon black having an iodine adsorption of less than about 60 mg/g carbon and a dibutyl phthalate absorption of greater than about 115 cc/100 g. Depending on device design, the composition can be used in low to high voltage applications.

36 Claims, 2 Drawing Sheets

PTC CONDUCTIVE POLYMER COMPOSITIONS

BACKGROUND OF THE INVENTION

The invention relates generally to polymeric positive temperature coefficient (PTC) compositions and electrical PTC devices. In particular, the invention relates to polymeric PTC compositions containing medium structure, large particle size, carbon blacks which exhibit improved over voltage capabilities and an enhanced PTC effect.

Electrical devices comprising conductive polymeric compositions that exhibit a PTC effect are well known in electronic industries and have many applications, including their use as constant temperature heaters, thermal sensors, low power circuit protectors and over current regulators for appliances and live voltage applications, by way of non-limiting example. A typical conductive polymeric PTC composition comprises a matrix of a crystalline or semi-crystalline thermoplastic resin (e.g., polyethylene) or an amorphous thermoset resin (e.g., epoxy resin) containing a dispersion of a conductive filler, such as carbon black, graphite chopped fibers, nickel particles or silver flakes. Some compositions additionally contain flame retardants, stabilizers, antioxidants, anti-ozonants, accelerators, pigments, foaming agents, crosslinking agents, dispersing agents and inert fillers.

At a low temperature (e.g. room temperature), the polymeric PTC composition has an ordered structure that provides a conducting path for an electrical current, presenting low resistivity. However, when a PTC device comprising the composition is heated or an over current causes the device to self-heat to a melting temperature, a transition from a crystalline phase to an amorphous phase, resulting in a large thermal expansion presents a high resistivity. In electrical PTC devices, for example, this resistivity limits the load current, leading to circuit shut off. In the context of this invention $T_s$ is used to denote the "switching" temperature at which the "PTC effect" (a rapid increase in resistivity) takes place. The sharpness of the resistivity change as plotted on a resistance versus temperature curve is denoted as "squareness", i.e., the more vertical the curve at the $T_s$, the smaller is the temperature range over which the resistivity changes from the low to the maximum values. When the device is cooled to the low temperature value, the resistivity will theoretically return to its previous value. However, in practice, the low temperature resistivity of the polymeric PTC composition may progressively increase as the number of low-high-low temperature cycles increases, an electrical instability effect. Crosslinking of a conductive polymer by chemicals or irradiation, or the addition of inert fillers or organic additives may be employed to improve electrical stability.

Attempts to enhance the voltage capability of PTC compositions have fairly recently involved the inclusion of specialized carbon blacks. For example, U.S. Pat. No. 5,174,924 to Yamada et al. demonstrates the usefulness of large particle size/high structure carbon blacks in place of other carbon blacks. The foregoing patent appears to disclose PTC compositions having improved voltage capabilities and a trade-off between device resistance and voltage capability. The improvements demonstrated by the foregoing patent are specifically limited, however, to the use of large particle size/high structure carbon blacks.

In view of the foregoing, there is still a need for the development of polymeric PTC compositions and devices comprising them that exhibit a high PTC effect, have a low initial resistivity, that exhibit substantial electrical and thermal stability, and that are capable of use over a broad voltage range.

SUMMARY OF THE INVENTION

The invention provides polymeric PTC compositions and electrical PTC devices having increased voltage capabilities while maintaining a low RT resistance. In particular, the polymeric compositions also demonstrate a high PTC effect (the resistivity at the $T_S$ is at least $10^3$ times the resistivity at 25° C.) and a low initial resistivity at 25° C. (preferably 10 Ωcm or less, more preferably 5 mΩ or less). The electrical PTC devices comprising these polymeric PTC compositions preferably have a resistance at 25° C. of 500 mΩ or less (preferably about 5 mΩ to about 500 mΩ, more preferably about 7.5 mΩ to about 200 mΩ, typically about 10 mΩ to about 100 mΩ) with a desirable design geometry.

The polymeric PTC compositions of the invention, demonstrating the above characteristics, comprise an organic polymer, a conductive filler including carbon black having an iodine adsorption of less than about 60 mg/g carbon and a dibutyl phthalate absorption of greater than about 115 cc/100 g, and, optionally, one or more additives selected from the group consisting of inert fillers, flame retardants, stabilizers, antioxidants, anti-ozonants, accelerators, pigments, foaming agents, crosslinking agents, coupling agents, co-agents and dispersing agents. The compositions may or may not be crosslinked to improve electrical stability before or after their use in the electrical PTC devices of the invention. Preferably, the polymer component of the composition has a melting point ($T_m$) of 100° C. to 250° C.

The electrical PTC devices of the invention have, for example, the high voltage capability to protect equipment operating on Line current voltages from overheating and/or overcurrent surges. The devices are particularly useful as self-resetting sensors for AC motors, such as those of household appliances, such as dishwashers, washers, refrigerators and the like. Additionally, PTC compositions for use in low voltage devices such as batteries, actuators, disk drives, test equipment and automotive applications are also described below.

DETAILED DESCRIPTION OF THE INVENTION

Figure 1:
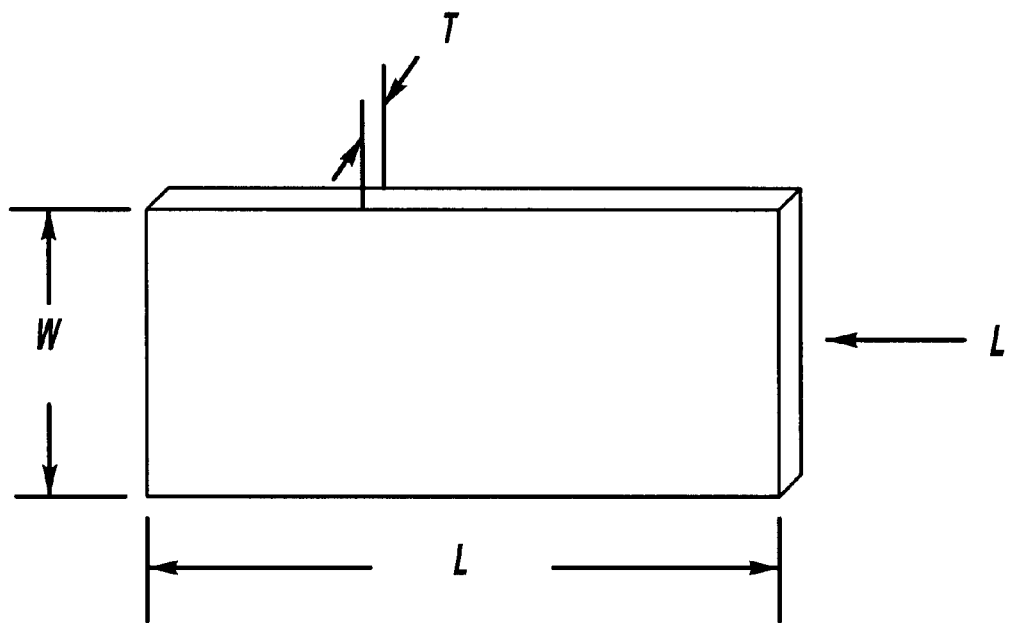
FIG. 1 is a schematic illustration of a PTC chip comprising the polymeric PTC composition of the invention sandwiched between two metal electrodes.

The polymeric PTC compositions of the invention comprise an organic polymer, a conductive filler including carbon black having an iodine adsorption of less than about 60 mg/g carbon and a dibutyl phthalate (DBP) absorption of greater than about 115 cc/100 g, and, optionally, one or more additives selected from the group consisting of inert fillers, flame retardants, stabilizers, antioxidants, anti-ozonants, accelerators, pigments, foaming agents, crosslinking agents, coupling agents, co-agents and dispersing agents. While not specifically limited to high voltage applications, for purposes of conveying the concepts of the present invention, PTC devices employing the novel PTC polymeric compositions will generally be described with reference to high voltage embodiments. The criteria for a high voltage capacity polymeric composition generally are (i) a high PTC effect, (ii) a low initial resistivity at 25° C., and (iii) the capability of withstanding a voltage of 110 to 240 VAC or greater while maintaining electrical and thermal stability. As used herein, the term "high PTC effect" refers to a composition resistivity at the $T_S$ that is at least $10^3$ times the composition resistivity at room temperature (for convenience, 25° C.). There is no particular requirement as to the temperature at which the composition switches to its higher resistivity state.

As used herein, the term "low initial resistivity" refers to an initial composition resistivity at 25° C. of 100 Ωcm or less, preferably 10 Ωcm or less, more preferably 5 Ωcm or less, especially 2 Ωcm or less, thus providing for a PTC device having a low resistance at 25° C. of about 500 mΩ or less, preferably about 5 mΩ to 500 mΩ, more preferably about 7.5 mΩ to about 10 mΩ to about 200 mΩ, typically about 10 Ωm to about 100 mΩ, with an appropriate geometric design and size, as discussed further below.

The organic polymer component of the composition of the present invention is generally selected from a crystalline organic polymer, an elastomer (such as polybutadiene or ethylene/propylene/diene (EPDM) polymer) or a blend comprising at least one of these. Suitable crystalline polymers include polymers of one or more olefins, particularly polyethylene; copolymers of at least one olefin and at least one monomer copolymerisable therewith such as ethylene acrylic acid, ethylene ethyl acrylate and ethylene vinyl acetate; melt shapeable fluoropolymers such as polyvinylidene fluoride and ethylene tetrafluoroethylene and blends of two or more such crystalline polymers. Other polymeric components of the composition of the present invention (i.e., nylon12 and/or nylon11) are disclosed in U.S. Pat. Nos. 5,837,164 and 5,985,182, incorporated by reference above.

It is known that the $T_S$ of a conductive polymeric composition is generally slightly below the melting point ($T_m$) of the polymeric matrix. If the thermal expansion coefficient of the polymer is sufficiently high near the $T_m$, a high PTC effect may occur.

The preferred semi-crystalline polymer component in the conductive polymeric composition of the present invention has a crystallinity of at least about 10% and preferably between about 40% to 98%. In order to achieve a composition with a high PTC effect, it is preferable that the polymer has a melting point ($T_m$) in the temperature range of 60° C. to 300° C. Preferably, the polymer substantially withstands decomposition at a processing temperature that is at least 20° C. and preferably less than 120° C. above the $T_m$.

The crystalline or semi-crystalline polymer component of the conductive polymeric composition may also comprise a polymer blend containing, in addition to the first polymer, between about 0.5 to 50.0% of a second crystalline or semi-crystalline polymer based on the total polymeric component. The second crystalline or semi-crystalline polymer is preferably a polyolefin-based or polyester-based thermoplastic elastomer. Preferably the second polymer has a melting point ($T_m$) in the temperature range of 100° C. to 200° C. and a high thermal expansion coefficient value at a temperature in the range $T_m$ to $T_m$ minus 10° C. that is at least four times greater than the thermal expansion coefficient value at 25° C.

The electrically conductive filler component of the present invention includes carbon black having an iodine adsorption of less than about 60 mg/g carbon and a dibutyl phthalate absorption of greater than about 115 cc/100 g. More preferably, the carbon black will have an iodine adsorption of between about 20 mg/g carbon to about 60 mg/g carbon and, still more preferably, between about 25 mg/g carbon to about 45 mg/g carbon. Under a highly preferred embodiment, the electrically conductive filler component includes carbon black having an iodine adsorption of between about 30 mg/g carbon to about 40 mg/g carbon. As should be understood by those skilled in the art, iodine adsorption is a well recognized measure of carbon black surface area, wherein the amount of iodine which is adsorbed on the surface of a given mass of carbon black is quantified.

The carbon black employed should also exhibit a dibutyl phthalate absorption (DBP) of between about 115 cc/100 g to less than about 170 cc/100 g. Still more preferably, the DBP absorption should range from between about 120 cc/100 g to about 150 cc/100 g. As should be understood by those skilled in the art DBP absorption is measured in accordance with ASTM D-2414-79.

The amount of carbon black having an iodine adsorption of less than about 60 mg/g carbon and a dibutyl phthalate absorption of greater than about 115 cc/100 g needed to achieve the desired resistivity objectives and PTC effect will depend on a number of key factors including the polymer(s) employed, the use of other particulate fillers and the method needed to prepare and form the composition into product. In general, the total amount of carbon black meeting the foregoing criteria will generally range from 40.0 phr to 250.0 phr and, preferably, from 70.0 phr to 190.0 phr. It should be understood that "phr" means parts per 100.0 parts of the organic polymer component.

Still other electrically conductive fillers may be employed in association with the carbon blacks set forth above, including but not limited to carbon blacks other than those having an iodine adsorption of less than about 60 mg/g carbon and a dibutyl phthalate (DBP) absorption of greater than about 115 cc/100 g, graphite and metal particles, or a combination of these. To the extent that other carbon blacks are employed, the ratio of carbon black having an iodine adsorption of less than about 60 mg/g carbon and a DBP absorption of greater than about 115 cc/100 g to other carbon blacks should be 1:50 and 3.5:1. Metal particles may include, but are not limited to, nickel particles, silver flakes, or particles of tungsten, molybdenum, gold platinum, iron, aluminum, copper, tantalum, zinc, cobalt, chromium, lead, titanium, tin alloys or mixtures of the foregoing. Such metal fillers for use in conductive polymeric compositions are known in the art. As such, the total conductive filler will generally range from 40.0 phr to 350.0 phr and, preferably, from 60.0 phr to 250.0 phr.

In addition to the polymeric component and conductive filler including carbon black having an iodine adsorption of less than about 60 mg/g carbon and a dibutyl phthalate absorption of greater than about 115 cc/100 g, the PTC composition may also include any one of a number of known additives. A preferred additive would include inert fillers.

The inert filler component, if any, comprises fibers formed from a variety of materials including, but not limited to, carbon, polypropylene, polyether ketone, acryl synthetic resins, polyethylene terephthalate, polybutylene terephthalate, cotton and cellulose. The total amount of fibers if employed, generally range from between about 0.25 phr to about 50.0 phr and, preferably, from about 0.5 phr to about 10.0 phr.

Additional inert fillers may also be employed including, for example, amorphous polymeric powders such as silicon, nylons, fumed silica, calcium carbonate, magnesium carbonate, aluminum hydroxide, titanium oxide, kaolin clay, barium sulphate, talc, chopped glass or continuous glass, among others. The total inert filler component generally ranges from about 2.0 phr to about 100.0 phr and, preferably, from 4.0 phr to about 12.0 phr.

In addition, the conductive polymeric composition may comprise any one of a number of other various additives. Examples of suitable stabilizers particularly for electrical and mechanical stability, include metal oxides, such as magnesium oxide, zinc oxide, aluminum oxide, titanium oxide, or other materials, such as calcium carbonate, magnesium carbonate, alumina trihydrate, and magnesium hydroxide, or mixtures of any of the foregoing. The proportion of stabilizers selected from the above list, among others is generally in the range of between about 0.1 phr and 30.0 phr and, preferably between about 0.5 phr to 12.0 phr.

Antioxidants may be optionally added to the composition and may have the added effect of increasing the thermal stability of the product. In most cases, the antioxidants are either phenol or aromatic amine type heat stabilizers, such as N,N'1,6-hexanediylbis (3,5-bis (1,1-dimethylethyl)-4-hydroxy-benzene) propanamide (Irganox 1098, available from Ciba Geigy Corp., Hawthorne, N.Y.), N-stearoyl-4-aminophenol, N-lauroyl-4-aminophenol, and polymerized 1,2-dihydro-2,2,4-trimethyl quinoline. The proportion by weight of the antioxidant agent in the composition may range from 0.1 phr to 15.0 phr and, preferably 0.5 phr to 7.5 phr.

To enhance electrical stability, the conductive polymer composition may be crosslinked by chemicals, such as organic peroxide compounds, or by irradiation, such as by a high energy electron beam, ultraviolet radiation or by gamma radiation, as known in the art. Although crosslinking is dependent on the polymeric components and the application, normal crosslinking levels are equivalent to that achieved by an irradiation dose in the range of 1 to 150 Mrads, preferably 2.5 to 20 Mrads, e.g., 10.0 Mrads. If crosslinking is by irradiation, the composition may be crosslinked before or after attachment of the electrodes.

Figure 2:
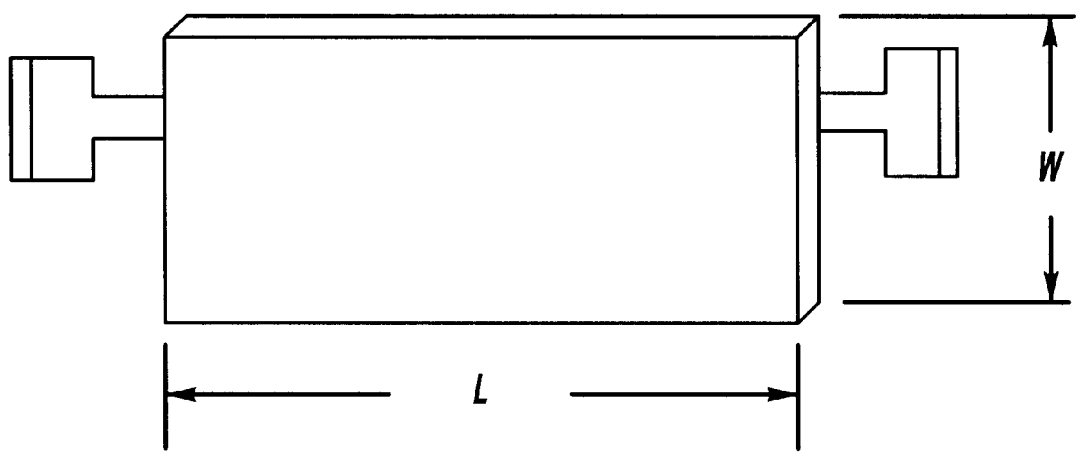
FIG. 2 is a schematic illustration of an embodiment of a PTC device according to the invention, comprising the PTC chip of FIG. 1 with two attached terminals.

In an embodiment of the invention, the high temperature PTC device of the invention comprises a PTC "chip" 1 illustrated in FIG. 1 and electrical terminals 12 and 14, as described below and schematically illustrated in FIG. 2. As shown in FIG. 1, the PTC chip 1 comprises the conductive polymeric composition 2 of the invention sandwiched between metal electrodes 3. The electrodes 3 and the PTC composition 2 are preferably arranged so that the current flows through the PTC composition over an area L×W of the chip 1 that has a thickness, T, such that W/T is at least 2, preferably at least 5, especially at least 10. The electrical resistance of the chip or PTC device also depends on the thickness and the dimensions W and L, and T may be varied in order to achieve a preferable resistance, described below. For example, a typical PTC chip generally has a thickness of 0.05 to 5 millimeters (mm), preferably 0.1 to 2.0 mm, and more preferably, 0.2 to 1.0 mm. The general shape of the chip/device may be that of the illustrated embodiment or may be of any shape with dimensions that achieve the preferred resistance.

It is generally preferred to use two planar electrodes of the same area which are placed opposite to each other on either side of a flat PTC polymeric composition of constant thickness. The material for the electrodes is not specially limited, and can be selected from silver, copper, nickel, aluminum, gold and the like. The material can also be selected from combinations of these metals, nickel plated copper, tinplated copper, and the like. The electrodes are preferably used in a sheet form. The thickness of the sheet is generally less than 1 mm, preferably less than 0.5 mm, and more preferably less than 0.1 mm.

The conductive polymeric compositions of the invention are prepared by methods known in the art. In general, the polymer or polymer blend, the conductive filler and additives (if appropriate) are compounded at a temperature that is at least 20° C. higher, but generally no more than 120° C. higher, than the melting temperature of the polymer or polymer blend. The compounding temperature is determined by the flow property of the compounds. In general, the higher the filler content (e.g., carbon black), the higher is the temperature used for compounding. Rather than compounding the additives at the same time as the polymer or polymer blend, it may be desirable to first form a dispersion of the polymer and conductive filler, i.e. carbon black and thereafter blend in the additives. After compounding, the homogeneous composition may be obtained in any form, such as pellets. The composition is then subjected to a hotpress compression or extrusion/lamination process and transformed into a thin PTC sheet.

PTC sheets obtained, e.g., by compression molding or extrusion, are then cut to obtain PTC chips having predetermined dimensions and comprising the conductive polymeric composition sandwiched between the metal electrodes. The composition may be crosslinked, such as by irradiation, if desired, prior to cutting of the sheets into PTC chips. Electrical terminals are then soldered to each individual chip to form PTC electrical devices.

A suitable solder provides good bonding between the terminal and the chip at 25° C. and maintains a good bonding at the switching temperature of the device. The bonding is characterized by the shear strength. A shear strength of 250 Kg or more at 25° C. for a 2×1 cm2 PTC device is generally acceptable. The solder is also required to show a good flow property at its melting temperature to homogeneously cover the area of the device dimension. The solder used generally has a melting temperature of 10° C., preferably 20° C. above the switching temperature of the device.

The following examples illustrate embodiments of the conductive polymeric PTC compositions and electrical PTC devices of the present invention particularly demonstrating a significant improvement over the teachings of U.S. Pat. No. 5,174,924 which is directed to the use of large particle size/high structure carbon blacks. However, these embodiments are not intended to be limiting, as other methods of preparing the compositions and devices e.g., injection molding, to achieve desired electrical and thermal properties may be utilized by those skilled in the art. The compositions which are used in the production of PTC devices were tested for various PTC properties and particularly the trade off between resistance and voltage capability. The resistance of the PTC chips and devices is measured, using a four wire standard method, with a micro-ohmmeter (e.g., Keithley 580, Keithley Instruments, Cleveland, Ohio) having an accuracy of ±0.01 Ω).

As reflected below, the overvoltage testing is conducted by a stepwise increase in the voltage starting at 5 volts. The voltage capability of the material is determined via dielectric failure.

EXAMPLES

Using the formulas shown in Table 1, the compounds were mixed for approximately 25 minutes at 180° C. on a two roll mill. The compounds were then extruded between nickel coated copper foils and irradiated to 100 kGrays. The sheet of PTC material was then cut into 10.1 by 14.4 mm chips and dip soldered to attach leads. The chips were then tested for resistance and voltage capability, with the following results being noted.

TABLE 1

| Formulation (based on phr) | | | | |
|---|---|---|---|---|
| | Control A | Control B | Control C | Example 1 |
| HDPE | 100 | 100 | 100 | 100 |
| N550 ($I_2$ = 43; DBP = 121) | 90 | | | |
| N660 ($I_2$ = 36; DBP = 90) | | 117 | | |
| N762 ($I_2$ = 27; DBP = 65) | | | 148 | |
| N683 ($I_2$ = 36; DBP = 137) | | | | 102 |
| Kaolin clay | 6 | 6 | 6 | 6 |
| Agerite MA | 3 | 3 | 3 | 3 |

Example 1 used all of the same components as controls A–C, except that a carbon black having an iodine adsorption of 36 mg/g carbon and a DBP structure of 137 cc/100 g was employed.

TABLE 2

| Properties of PPTC Compounds (100 kGrays)* | | | | |
|---|---|---|---|---|
| Resistance Stability | Control A | Control B | Control C | Example 1 |
| Device thickness (inches) | .0162 | .0182 | .0170 | .0167 |
| Device resistance mOhms (RT) | 55.6 | 41.1 | 47.0 | 66.8 |
| Cold cycling (−40° C.)** % increase after 1000 cycles | 900.0 | 450.0 | 217.0 | 67.4 |
| Voltage capability (volts) | >300 | >300 | >300 | >300 |

*10 by 14 mm chips; extruded samples
**2 min. on; 1 min. off; 30 volts; 8 amps

Figure 3:
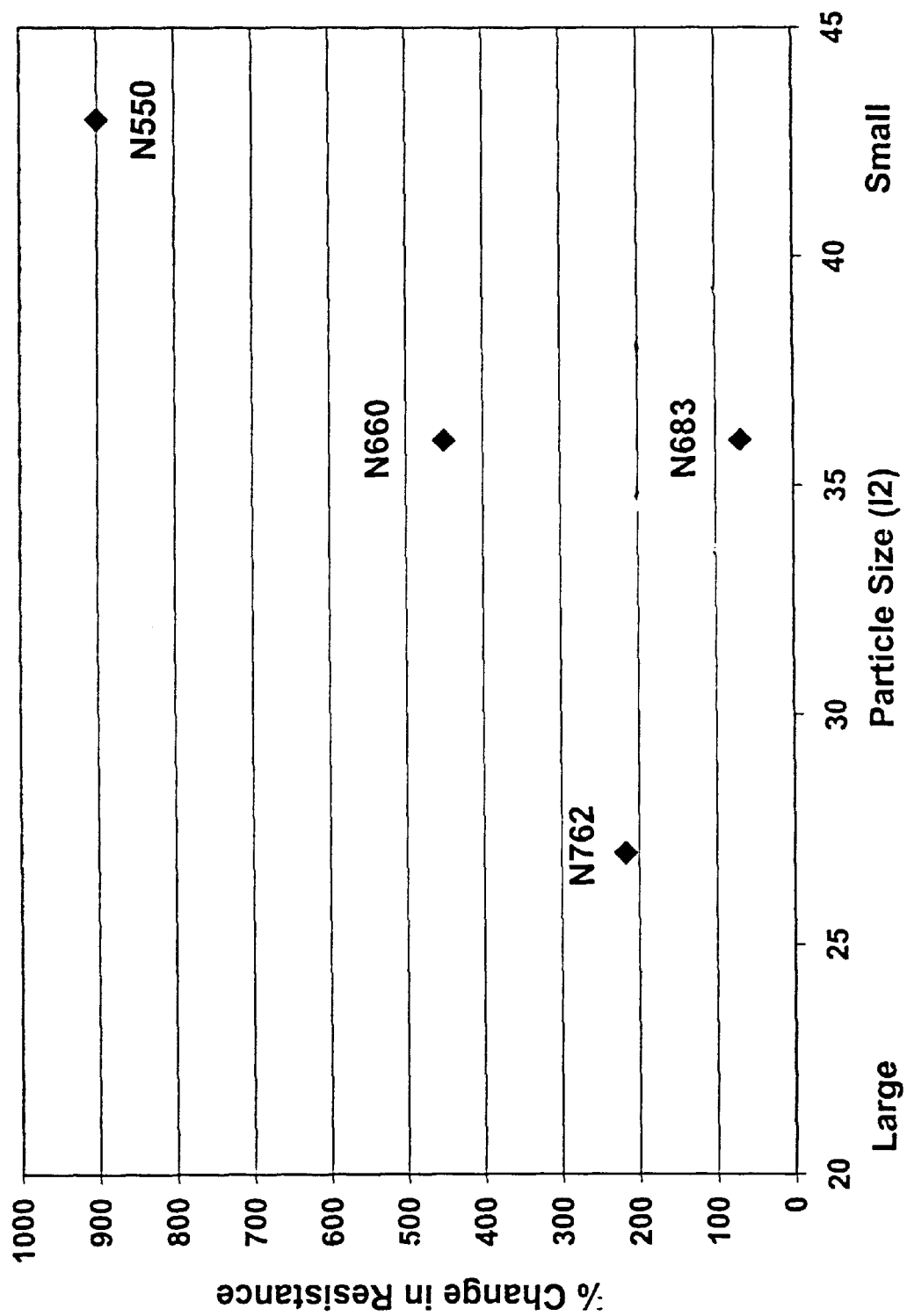
FIG. 3 is a graph plotting the percentage change in resistance versus PTC compositions employing carbon blacks of varying particle size and structure, after cycling at −40° C. for 1000 cycles at 30 volts, 8 amps with an on time of 2 minutes and an off time of 1 minute.

Surprisingly, as shown in Table 2 above and with reference to FIG. 3, the resistance stability for this composition demonstrated significant improvement over the controls, and particularly over Controls A and B. The results were unexpected because N683 does not follow the general trend of particle size versus resistance stability as illustrated in FIG. 3.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

I claim:

1. A polymeric PTC composition comprising:
   an organic polymer, a conductive filler including carbon black having an iodine adsorption of greater than about 20 mg/g carbon less than about 60 mg/g carbon and a dibutyl phthalate absorption of greater than about 115 cc/100 g to less than about 170 cc/100 g and an antioxidant selected from the group consisting of N,N'1,6-hexanediylbis (3.5-bis 11-dimethylethyl)-4-hydroxybenzene) propanamide (N-stearoyl-4-aminophenol, N-lauroyl-4-aminophenol, polymerized 1,2-dihydro-2,2,4-trimethyl guinoline, and mixtures thereof and, optionally, one or more additives selected from the group consisting of inert fillers, flame retardants, stabilizers, anti-ozonants, accelerators, pigments, foaming agents, crosslinking agents, coupling agents, co-agents and dispersing agents.

2. The composition of claim 1, wherein said carbon black having an iodine adsorption of greater than 20 mg/g carbon to less than about 60 mg/g carbon and a dibutyl phthalate absorption of greater than about 115 cc/100 g to less than about 170 cc/100 g is present in an amount of at least about 40.0 phr.

3. The composition of claim 1, wherein said carbon black having an iodine adsorption of greater than 20 mg/g carbon to less than about 60 mg/g carbon and a dibutyl phthalate absorption of greater than about 115 cc/100 g to less than about 170 cc/100 g is present in an amount of at least about 70.0 phr.

4. The composition of claim 1, wherein said carbon black has an iodine adsorption of between about 25 mg/g carbon and 45 mg/g carbon and a dibutyl phthalate absorption of between about 120 cc/100 g to about 150 cc/100 g.

5. The composition of claim 1, wherein the polymer includes a crystalline or semi-crystalline polymer.

6. The composition of claim 1 wherein the organic polymer includes at least one polymer selected from the group consisting of high density polyethylene, nylon-11, nylon-12, polyvinylidene fluoride and mixtures or copolymers thereof.

7. The composition of claim 1, having a resistivity at 25° C. of 100 or less.

8. The composition of claim 1, wherein the conductive filler is present in an amount of between about 40.0 phr to about 350.0 phr.

9. The composition of claim 1, wherein said inert filler is present in an amount of between about 2.0 phr to 100.0 phr.

10. The composition of claim 1, wherein said stabilizers are present in an amount of between about 0.1 phr and 15.0 phr.

11. The composition of claim 1, wherein said antioxidants are present in an amount 0.1 phr to about 15.0 phr.

12. The composition of claim 1, wherein the particulate conductive filler is selected from the group consisting of carbon blacks other than those having an iodine adsorption of less than about 60 mg/g carbon and a dibutyl phthalate absorption of greater than about 115 cc/100 g, graphite, metal particles, and mixtures thereof.

13. The composition of claim 12, wherein the metal particles are selected from the group consisting of nickel particles, silver flakes, or particles of tungsten, molybdenum, gold, platinum, iron, aluminum, copper, tantalum, zinc, cobalt, chromium, lead, titanium, tin alloys, and mixtures thereof.

14. The composition of claim 1, wherein the inorganic stabilizers are selected from the group consisting of magnesium oxide, zinc oxide, aluminum oxide, titanium oxide, calcium carbonate, magnesium carbonate, alumina trihydrate, magnesium hydroxide, and mixtures thereof.

15. The composition of claim 1, wherein the antioxidant comprises a phenol or an aromatic amine.

16. The composition of claim 1, wherein the polymeric composition is crosslinked with the aid of a chemical agent or by irradiation.

17. The composition of claim 1, further comprising between about 0.5% to 50.0% of a second crystalline or semi-crystalline polymer based on the total polymeric component.

18. The composition of claim 1 wherein the organic polymer has a melting temperature $T_m$ of about 60° C. to about 300° C.

19. A polymeric PTC composition comprising:

an organic polymer, a conductive filler including carbon black having an iodine adsorption of less than about 60 mg/g carbon and a dibutyl phthalate absorption of greater than about 115 cc/100 g, an antioxidant selected from the group consisting of N,N'1,6-hexanediylbis (3,5-bis(1,1-dimethylethyl)-4-hydroxybenzene) propanamide, (N-stearoyl-4-aminophenol, N-lauroyl-4-aminophenol, polymerized 1,2-dihydro-2,2,4-trimethyl quinoline, and mixtures thereof, and, optionally, one or more additives selected from the group consisting of inert fillers, flame retardants, stabilizers, anti-ozonants, accelerators, pigments, foaming agents, crosslinking agents, coupling agents, co-agents and dispersing agents.

20. The composition of claim 19, wherein said carbon black having an iodine adsorption of less than about 60 mg/g carbon and a dibutyl phthalate absorption of greater than about 115 cc/100 g is present in an amount of at least about 40.0 phr.

21. The composition of claim 19, wherein said carbon black having an iodine adsorption of less than about 60 mg/g carbon and a dibutyl phthalate absorption of greater than about 115 cc/100 g is present in an amount of at least about 70.0 phr.

22. The composition of claim 21, wherein said carbon black has an iodine adsorption of between about 20 mg/g carbon to about 60 mg/g carbon and a dibutyl phthalate absorption of between about 115 cc/100 g to about 170 cc/100 g.

23. The composition of claim 19, wherein said carbon black has an iodine adsorption of between about 25 mg/g carbon and 45 mg/g carbon and a dibutyl phthalate absorption of between about 120 cc/100 g to about 150 cc/100 g.

24. The composition of claim 19, wherein the polymer includes a crystalline or semi-crystalline polymer.

25. The composition of claim 19, wherein the organic polymer includes at least one polymer selected from the group consisting of high density polyethylene, nylon-11, nylon-12, polyvinylidene fluoride and mixtures or copolymers thereof.

26. The composition of claim 19, wherein the organic polymer has a melting point, $T_m$ of 60° C. to 300° C.

27. The composition of claim 19, having a resistivity at 25° C. of 100 or less.

28. The composition of claim 19, wherein the conductive filler is present in an amount of between about 40.0 phr to about 350.0 phr.

29. The composition of claim 19, wherein said inert filler is present in an amount of between about 2.0 phr to 100.0 phr.

30. The composition of claim 19, wherein said stabilizers are present in an amount of between about 0.1 phr and 15.0 phr.

31. The composition of claim 19, wherein said antioxidants are present in an amount 0.1 phr to about 15.0 phr.

32. The composition of claim 19, wherein the particulate conductive filler is selected from the group consisting of carbon blacks other than those having an iodine adsorption of less than about 60 mg/g carbon and a dibutyl phthalate absorption of greater than about 115 cc/100 g, graphite, metal particles, and mixtures thereof.

33. The composition of claim 32, wherein the metal particles are selected from the group consisting of nickel particles, silver flakes, or particles of tungsten, molybdenum, gold, platinum, iron, aluminum, copper, tantalum, zinc, cobalt, chromium, lead, titanium, tin alloys, and mixtures thereof.

34. The composition of claim 19, wherein the inorganic stabilizers are selected from the group consisting of magnesium oxide, zinc oxide, aluminum oxide, titanium oxide, calcium carbonate, magnesium carbonate, alumina trihydrate, magnesium hydroxide, and mixtures thereof.

35. The composition of claim 19, wherein the polymeric composition is crosslinked with the aid of a chemical agent or by irradiation.

36. The composition of claim 19, further comprising between about 0.5% to 50.0% of a second crystalline or semi-crystalline polymer based on the total polymeric component.

* * * * *

UNITED STATES PATENT AND TRADEMARK OFFICE
CERTIFICATE OF CORRECTION

PATENT NO. : 6,660,795 B2
DATED : December 9, 2003
INVENTOR(S) : Edward J. Blok

It is certified that error appears in the above-identified patent and that said Letters Patent is hereby corrected as shown below:

Column 2,
Line 36, "Line" should be -- line --.

Column 3,
Line 25, "$\Omega$m" should be -- m$\Omega$ --.

Column 7,
Line 67, after "propanamide" insert -- , --.

Column 8,
Line 2, "guinoline" should be -- quinoline --.
Line 54, after "amount" insert -- of between about --.

Column 10,
Line 23, after "amount" insert -- of between about --.

Signed and Sealed this

Twenty-eighth Day of June, 2005

JON W. DUDAS
*Director of the United States Patent and Trademark Office*